(12) United States Patent
Longo

(10) Patent No.: US 6,476,137 B1
(45) Date of Patent: Nov. 5, 2002

(54) TERNARY POLYMER BLEND, THE FILM CONTAINING IT, AND THE EASY-TO-OPEN PACKAGE MADE THEREWITH

(75) Inventor: Eugenio Longo, Milan (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/673,770

(22) PCT Filed: Apr. 9, 1999

(86) PCT No.: PCT/EP99/02411

§ 371 (c)(1),
(2), (4) Date: Dec. 26, 2000

(87) PCT Pub. No.: WO99/54398

PCT Pub. Date: Oct. 28, 1999

(30) Foreign Application Priority Data

Apr. 16, 1998 (EP) .............................................. 98106960

(51) Int. Cl.$^7$ .......................... C08L 23/08; C08L 23/20; C08J 5/18; C09J 123/08; C09J 123/20

(52) U.S. Cl. .......................... 525/191; 525/221; 525/222; 525/223; 525/240; 428/212; 428/220; 428/500; 428/515

(58) Field of Search ................................. 525/191, 221, 525/222, 223, 240; 428/212, 220, 500, 515

(56) References Cited

U.S. PATENT DOCUMENTS

| | | |
|---|---|---|
| 4,082,877 A | 4/1978 | Shadle |
| 4,189,519 A | 2/1980 | Ticknor |
| 4,277,578 A | 7/1981 | Yoshimura et al. |
| 4,356,222 A | 10/1982 | Harakawa et al. |
| 4,469,754 A | 9/1984 | Hoh et al. |
| 4,501,634 A | 2/1985 | Yoshimura et al. |
| 4,521,467 A | 6/1985 | Berger |
| 4,619,859 A | 10/1986 | Yoshimura et al. |
| 4,680,340 A | 7/1987 | Oreglia et al. |
| 4,729,476 A | 3/1988 | Lulham et al. |
| 4,766,174 A | 8/1988 | Statz |
| 4,803,104 A * | 2/1989 | Peigneur et al. ........... 428/35.1 |
| 4,859,514 A | 8/1989 | Friedrich et al. |
| 4,876,156 A | 10/1989 | Hwo |
| 4,916,190 A | 4/1990 | Hwo |
| 4,944,409 A | 7/1990 | Busche et al. |
| 5,023,121 A | 6/1991 | Pockat et al. |
| 5,066,543 A | 11/1991 | Hwo |
| 5,073,414 A | 12/1991 | Castro |
| 5,100,721 A * | 3/1992 | Akao ........................ 428/218 |
| 5,126,197 A | 6/1992 | Schinkel et al. |
| 5,334,643 A | 8/1994 | Gage |
| 5,547,752 A | 8/1996 | Yanidis |
| 5,593,775 A | 1/1997 | Hargarter et al. |
| 5,604,000 A | 2/1997 | May |
| 5,663,232 A | 9/1997 | Seppanen et al. |
| 5,677,069 A | 10/1997 | Seppanen et al. |
| 5,716,698 A | 2/1998 | Schreck et al. |
| 5,733,636 A | 3/1998 | May |
| H1727 H | 5/1998 | Jones et al. |

FOREIGN PATENT DOCUMENTS

| | | | |
|---|---|---|---|
| AU | 664650 | * | 3/1996 |
| EP | 213 698 B1 | * | 3/1987 |
| EP | 0 351 620 | * | 1/1990 |
| EP | 0 785 066 A2 | * | 7/1997 |
| JP | 58101134 A2 | * | 6/1983 |
| JP | 58175635 A2 | * | 10/1983 |
| JP | 61200142 A2 | * | 9/1986 |
| JP | 63051438 A | * | 3/1988 |
| JP | 4093340 A2 | * | 3/1992 |
| JP | 6270248 A2 | * | 9/1994 |
| JP | 08208895 A | * | 8/1996 |
| JP | 10147672 A | * | 6/1998 |
| WO | 93/24568 | * | 12/1993 |
| WO | 94/28066 | * | 12/1994 |
| WO | 95/125766 | * | 9/1995 |
| WO | 97/28960 | * | 8/1997 |
| WO | 97/48554 | * | 12/1997 |
| WO | 98/05706 | * | 2/1998 |
| WO | 99/54398 | * | 10/1999 |

OTHER PUBLICATIONS

DuPont Powerpoint Presentation entitled "SURLYN 1650SB Peelable Blends with PB" No Date.*

Hwo, Polybutylene Blends as Easy Open Seal Coats for Flexible Packaging and Lidding, Journal of Plastic Film & Sheeting, vol. 3, Oct. 1987, pp. 245–260.*

Hwo, Polybutylene Blends as Easy Open Seal Coats for Flexible Packaging and Lidding, Shell Development Company, Presentation at 1987 Tappi Polymers, Laminations and Coatings Conference, San Francisco, CA, Sep. 9–11, 1987.*

* cited by examiner

Primary Examiner—Nathan M. Nutter

(57) ABSTRACT

Object of the present invention is an extrudable blend comprising (i) a copolymer of ethylene and acrylic acid or methacrylic acid (ii) a modified EVA copolymer and (iii) a polybutylene. Included are the films comprising said blend in the sealant layer or in a layer directly adhered to the sealant layer, and the easy-to-open packages obtained therefrom.

27 Claims, 3 Drawing Sheets

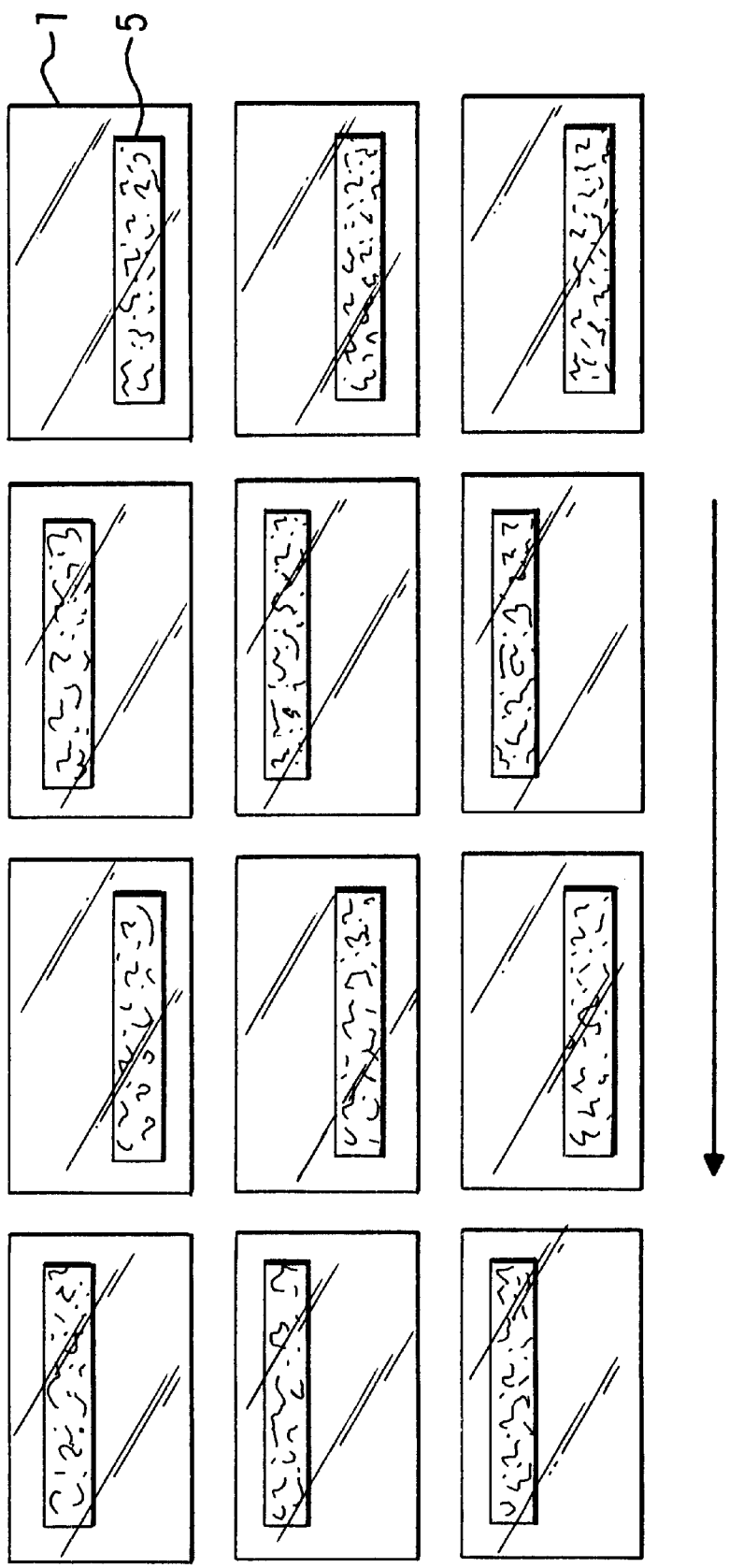

TERNARY POLYMER BLEND, THE FILM CONTAINING IT, AND THE EASY-TO-OPEN PACKAGE MADE THEREWITH

FIELD OF THE INVENTION

The present invention relates to an easy to open package, to the film used in said package and to the polymer blend making up one of its layers.

BACKGROUND OF THE INVENTION

In packaging there is a need for films which can be used, either alone or in combination with another film, to securely package articles and at the same time allow the easy openability of the package.

A wide variety of products, especially food products like meat, sausages, cheese and the like, are being offered in visually attractive packages made from two thermoplastic webs using vacuum skin packaging, thermoforming or other processes.

In a vacuum skin packaging process, a product is placed on a support, either in the form of a flat sheet or of a shaped tray, and, by differential air pressure, a heated film above the product is molded down, upon and around the product, and against the support, the space between the upper film and the support having been evacuated. The upper heated film thus forms a tight skin around the product and is sealed to the support.

In the thermoforming process a product is placed on the support, and the upper thermoplastic web is sealed to the flange-like edges of the support using heated sealing bars or similar equipment.

In both cases the two thermoplastic webs are sealed together, and safely secure the product therebetween. Opening of the packages thus obtained may be a problem as it may require the use of scissors, knives or other cutting and dangerous devices.

To prevent this problem the packages should be easily openable by manually pulling apart the two webs, normally starting from a point like a comer of the package where the upper web has purposely not been sealed to the support. Packages that can be opened in this way are called "easy-to-open" or "EZO" packages.

The easy-to-open packages of the prior art are based on three different mechanisms.

In the first one ("peelable easy opening") the package is opened by separating the two webs at the seal interface. This concept is being widely used in thermoformed, form-fill-seal and also in vacuum skin packages. The easy opening or peeling strength (force per given width) is identical to the seal strength and may be controlled by an appropriate choice of the chemical similarity or dissimilarity of the sealing layers of the upper and lower webs. It is a disadvantage of this type of easy opening mechanism that it is strongly affected by the conditions of the sealing process and particularly by even minor variations in the sealing temperature and pressure Therefore the easy opening strength will differ widely for a series of packages and a rupture of the web that is torn to open the package (typically the upper web) may occur when it is sealed too strongly to the other one (the lower web).

In the second mechanism ("adhesive failure") the opening of the package is achieved through an initial breakage through the thickness of one of the sealing layers followed by delamination of this layer from the underlying support or film. A typical example is a system where the seal layers of both the upper and lower webs are made from polyethylene and one of the seal layers is adhered to a polyamide surface. The low bond between polyethylene and polyamide permits the delamination to take place during the opening of the package. When the delamination reaches the area of the packed products, a second breakage through the sealing layer takes place. As a result the entire sealing layer of one of the two webs is separated from one of the webs and is left sealed to the opposite web.

The easy opening strength in this case is directly related to the bond between the seal layer and the adjacent film layer and accordingly it depends primarily on the chemical similarity or dissimilarity of the two materials. However, the coextrusion conditions such as pressure, temperature and time of contact between the molten materials also have a major effect on the final bond strength between the two layers.

The third system is based on the "cohesive failure" mechanism. In this latter system the easy opening feature is achieved by internal rupture of a seal layer that, during opening of the package, breaks along a plane parallel to the layer itself.

An example of easy-to-open packages based on this mechanism is provided in EP-B-192,131 describing an easy-to-open package with a seal layer comprising a) an ionomer having a melt flow index of less than 5, and b) a modified ethylene/vinyl acetate copolymer having a substantially higher melt flow index, whereby the melt flow indices of the two polymers in the seal layer differ by at least 10.

This system is based on the different chemical nature of the two components. The two materials are only partially compatible and consequently the material fails when a transversal force is applied to this layer (packaging opening) The easy opening system described in EP-B-192,131 shows however a high variability in the easy opening strength, or % variation (3σ) from the average value, that is typically higher than 55% and up to about 120%. Furthermore the average value of the opening strength generally obtained is >6.00 N/25.4 mm. Said value is currently considered too high for an easy to open package, particularly if the seal area varies in a great range, such as in vacuum skin packaging.

The high variability is probably due to the fact that the compatibility of the blend described in EP-B-192,131 can be affected by even small variations in the method of manufacturing of the web, e.g. a higher or lower opening strength can be obtained by varying the extrusion temperature or the quenching conditions by few degrees C.

OBJECT AND SUMMARY OF THE INVENTION

There is a need of an improved easy opening system assuring a lower easy opening strength and also a lower % variation (3σ) from the average value.

It has now been found that if the sealing layer of a thermoplastic web comprises a blend of (i) a copolymer of ethylene and acrylic acid or methacrylic acid, (ii) a modified EVA copolymer, and (iii) a polybutylene, said layer will cohesively fail and rupture internally even when a transversal force lower than 6.00 N/25.4 mm is applied.

It has also been found that the % variation (3σ) from the average value is remarkably reduced and is less than about 55%, typically less than about 35% of the average value.

Said thermoplastic web can therefore be employed in the manufacture of an easy-to-open package where an article is wrapped into the thermoplastic web or is placed between a lower and a upper thermoplastic web wherein at least one of said webs comprises a sealing layer comprising the above blend.

It has also been found that is possible to obtain an easy-to-open package even when the blend is not in the sealing layer but in a layer directly adhered to the sealing layer provided that said sealing layer has a thickness of less than 10 µm, and preferably less than 7 µm.

A first object of the present invention is therefore an extrudable blend of
 (i) a copolymer of ethylene and acrylic acid or methacrylic acid,
 (ii) a modified EVA copolymer, and
 (iii) a polybutylene A second object of the present invention is a thermoplastic film wherein the sealing layer, or the layer directly adhered to the sealing layer, comprises a blend of
 (i) a copolymer of ethylene and acrylic acid or methacrylic acid,
 (ii) a modified EVA copolymer, and
 (iii) a polybutylene.

A third object of the present invention is an easy-to-open package comprising:
 a lower thermoplastic web including a first sealing layer (a),
 an upper thermoplastic web including a second sealing layer (b) and
 optionally an additional thermoplastic layer (c) adjacent and directly bonded to one of the sealing layer (a) and (b),
 the lower and upper webs being sealed to each other and enclosing an article, said package being characterized in that one of the layers (a), (b), or (c) comprises a ternary blend of
 (i) a copolymer of ethylene and acrylic acid or methacrylic acid,
 (ii) a modified EVA copolymer, and
 (iii) a polybutylene.

A fourth object of the present invention is a method of forming an easy-to-open package, which method comprises disposing a product between a lower thermoplastic web including a first sealing layer (a) and an upper thermoplastic web including a second sealing layer (b), heating the upper web and moulding it down upon and around the product and against the support, the space between the heated upper film and the support having been evacuated to form a tight skin around the product, and sealing said upper film to the support by differential air pressure said method being characterized in that one of the sealing layers (a) and (b) or a layer (c) directly adhered to one of the sealing layers (a) and (b), comprises a ternary blend of
 (i) a copolymer of ethylene and acrylic acid or methacrylic acid,
 (ii) a modified EVA copolymer, and
 (iii) a polybutylene.

In a preferred embodiment the layer comprising the blend is not a sealing layer, but a layer (c) directly adhered to one of the sealing layers, thus assuring a good seal strength and lowering the dependence of the easy opening strength from the process conditions.

In such a case the thickness of the seal layer to which said layer (c) is directly adhered will be less than 10 µm, preferably less than 7 µm.

DESCRIPTION OF THE DRAWINGS

In the drawings which are attached hereto and make part of this disclosure:

FIG. 3 is a sketch of the positioning of the product in the preparation of the samples for the easy opening strength test that will be described later. In said figure, the arrow indicates the machine direction.

Figure 1:
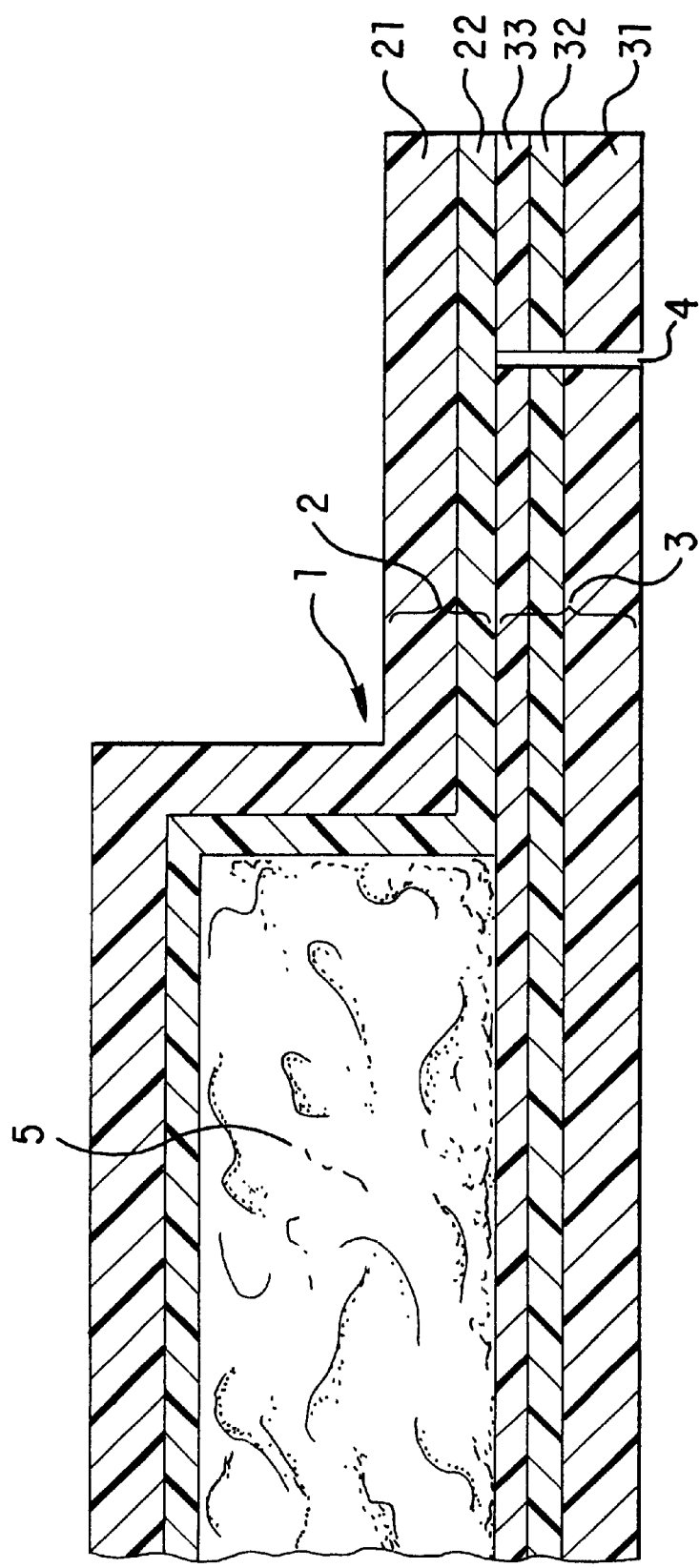
FIG. 1 and FIG. 2 are cross views of a respectively closed and opened package representing one particular embodiment of the present invention wherein an article is packaged between an upper and a lower web by the VSP method. The lower web has the inventive easy opening blend in a layer directly adhering to the sealing layer.

The following reference characters are used in the Figures:
 1 package
 2 upper web
 21 substrate layer of the upper web
 22 sealing layer of the upper web
 3 bottom web
 31 substrate layer of the bottom web
 32 easy opening layer
 33 sealing layer of the bottom web
 4 a pre-cut made in the bottom web
 5 the packaged article Like reference characters are used to identify like or corresponding features throughout the figures.

Definitions

As used herein, the term "film" is used in a generic sense to include plastic web, regardless of whether it is film or sheet. Films of and used in the present invention may have a thickness of up to 2 mm or more.

As used herein, the term "package" refers to packaging materials used in the packaging of a product.

As used herein, the term "homopolymer" refers to a polymer resulting from the polymerization of a single monomer, i.e., a polymer consisting essentially of a single type of repeating unit.

As used herein, the term "copolymer" refers to polymers formed by the polymerization reaction of at least two different monomers.

As used herein, the term "polyolefin" refers to any polymerized olefin, which can be linear, branched, cyclic, aliphatic, aromatic, substituted or unsubstituted. More specifically, included in the term "polyolefin" are homopolymers of olefin, copolymers of olefins, copolymers of an olefin and a non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene-vinyl acetate copolymer (EVA), ethylene unsaturated ester copolymer and ethylene unsaturated acid copolymer [especially ethylene/butyl acrylate copolymer, ethylene/methyl acrylate, ethylene-acrylic acid copolymer (EAA), ethylene/methacrylic acid copolymer (EMAA)], modified polyolefin resins, ionomer resins, polymethylpentene, etc.

As used herein, the term "ethylene-alpha-olefin copolymer" and "ethylene/alpha olefin copolymer", refer to such heterogeneous materials as linear low density polyethylene (LLDPE), and very low and ultra low density polyethylene (VLDPE and ULDPE); and homogeneous polymers such as metallocene-catalyzed EXACT™ linear homogeneous ethylene/alpha olefin copolymers resins obtainable from Exxon Chemical Company and TAFMER™ linear homogeneous ethylene-alpha olefin copolymer resins obtainable from Mitsui Petrochemical Corporation. All these materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structure. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 g/cm$^3$ to about 0.94 g/cm$^3$. Other ethylene/alpha olefin copolymers such as the long chain branched homogeneous ethylene/alpha olefin copolymers available from the Dow Chemical Company, known as AFFINITY™ resins, are also included as another type of homogeneous ethylene-alpha olefin copolymer.

As used herein, the phrase "directly adhered" or "directly adhering", as applied to film layers, is defined as adhesion of the subject film layer to the object film layer, without a tie layer, adhesive, or other layer there between.

As used herein "contiguous", when referred to two layers, is intended to refer to two layers that are directly adhered one to the other. In contrast, as used herein, the word "between", as applied to a film layer expressed as being between two other specified layers, includes both direct adherence of the subject layer to the two other layers it is between, as well as lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continues shapes by forcing a molten plastic material through a die, followed by cooling. Immediately prior to extrusion through the die, the relatively high viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e. quenching.

As used herein, the phrase "outer layer" or "skin layer" refer to any film layer having only one of its principal surfaces directly adhered to another layer of the film.

As used herein, the phrase "inner layer" refers to any layer having both its surfaces directly adhered to another layer of the film.

As used herein, the term "core", and the phrase "core layer" refer to any inner layer which has a primary function other than serving as an adhesive or compatibilizer for adhering two layers to one another.

As used herein, the phrase "tie layer" refers to any inner layer having the primary purpose of adhering two layers to one another.

As used herein, the phrase "bulk layer" refers to any inner layer having the primary purpose to improve the mechanical properties.

As used herein, the phrases "seal layer", "sealing layer", "heat-seal layer", and "sealant layer", refer to an outer film layer involved in the sealing of the film to itself, another film layer of the same or another film and/or another article which is not a film.

As used herein, the term "seal" refers to any seal of a first region of a film surface to a second region of a film surface, wherein the seal is formed by heating the regions to at least their respective seal initiation temperatures. The heating can be performed by anyone or more of a wide variety of manners, such as using a heated bar, hot air, infrared radiation, etc.

As used herein, the phrase "cohesive failure" refers to any system where the easy opening feature is achieved by internal rupture of a layer which during opening of the package breaks along a plane parallel to the layer itself.

As used herein, the phrase "easy opening strength" refers to the resistance of a film comprising an easy opening blend to peeling according to the method described in the example of the present invention.

As used herein, the phrase "differential air pressure" refers to atmospheric pressure outside versus vacuum inside of the package.

DETAILED DESCRIPTION OF THE INVENTION

While the invention will be described in connection with one or more preferred embodiments, it will be understood that the invention is not limited to these embodiments. On the contrary, the invention includes all alternatives, modifications, and equivalents as may be included within the scope of the appended claims.

According to a first object of the present invention a new blend is provided comprising (i) a copolymer of ethylene and acrylic acid or methacrylic acid, (ii) a modified EVA copolymer, and (iii) a polybutylene.

The term "copolymer of ethylene and acrylic acid or methacrylic acid" refers to a copolymer of ethylene with a copolymerisable ethylenically unsaturated carboxylic acidic monomer selected from acrylic acid and methacrylic acid. The copolymer typically contains from about 4% to about 18% by weight of acrylic or methacrylic acid units. Said copolymer can also contain, copolymerized therein, an alkyl acrylate or methacrylate, such as n-butyl acrylate or methacrylate or isobutyl acrylate or methacrylate. Said copolymer can be in the free acid form as well as in the ionized or partially ionized form wherein the neutralizing cation can be any suitable metal ion, e.g. an alkali metal ion, a zinc ion, or other multivalent metal ions; in this latter case the copolymer is also termed "ionomer".

According to a preferred embodiment of the present invention, component (i) is an ionomer. Suitable polymers are those having a low melt flow index of less than 5 and more preferably less than 2. Particularly suitable polymers are ionomeric resins with an acid content of up to 10%. Such polymers are commercially available as Surlyn™ (by DuPont).

The term "modified EVA" refers to ethylene-vinyl acetate based copolymer that may be modified either by the presence of a third unit, such as CO, in the polymer chain or by blending therewith or grafting thereon another modifying component.

Particularly suitable for the present invention are terpolymers obtained by the copolymerization of ethylene, vinyl acetate and carbon monoxide, as those described in e.g. U.S.

Pat. No. 3,780,140. Particularly preferred are those terpolymers comprising 3–30 wt. % of units deriving from carbon monoxide, 40–80 wt. % of units deriving from ethylene and 5–60 wt. % of units deriving from vinyl acetate.

Alternatively, suitable modified EVA resins include ethylene-vinyl acetate copolymers grafted with carboxylic or, preferably, anhydride functionalities, such as for instance EVA grafted with maleic anhydride.

In a preferred embodiment the difference between the melt flow indices of polymer (i) and of polymer (ii) in the polymer blend according to the present invention is at least 5, preferably at least 10, more preferably at least 15 and even more preferably at least 20. MFI are measured under the conditions E of ASTM D 1238.

The term "polybutene" or "polybutylene" includes homo and copolymers consisting essentially of a butene-1, butene-2, isobutene repeating units as well as ethylene-butene copolymers. Particularly suitable for the present invention are the ethylene-butene copolymers.

The inventor has found that by using the ternary blend of the present invention, due to an internal incompatibility, a low easy opening strength is provided and that additionally the average value has a low % variation.

The blend according to the present invention is simply obtained thoroughly mixing the three components in powder form and then melt extruding the blend.

In a preferred embodiment of the present invention the blend comprises from about 35 wt. % to about 83 wt. % of a copolymer of ethylene and acrylic acid or methacrylic acid (i), from about 15 wt. % to about 30 wt. % of a modified ethylene/vinyl acetate copolymer (ii) and of from about 2 wt. % to about 50 wt. % of a polybutylene (iii).

Even more preferably the blend according to the present invention is made of a mixture of from about 45 wt. % to about 75 wt. % of a copolymer of ethylene and acrylic acid or methacrylic aci (i), of from about 20 wt. % to about 30 wt. % of a modified ethylene/vinyl acetate copolymer (ii) and of from about 5 wt. % to about 25 wt. % of a polybutylene (iii).

The blend according to the present invention may be used as a layer of a mono or preferably a multilayer film.

A second object of the present invention is therefore a thermoplastic film wherein the sealing layer or the layer directly adhering to the sealing layer comprises the above described inventive blend.

The easy opening strength obtained by using the ternary blend in a film according to the present invention is typically comprised in the range of from about 2.00 to about 6.00 N/25.4 mm, more preferably in the range of from about 2.50 to about 5.00 N/25.4 mm.

The % variation (3σ) on the average value of the easy opening strength is lower than about 55%, and generally lower than 35%, thus affording reproducible easy-to-open packages.

The thickness of the film according to the present invention will depend on the type of application foreseen. As an example for use as the lower thermoformable web for VSP applications, said film typically has a thickness up to about 1,200 μm, preferably up to about 1,000 μm, generally comprised between about 200 and about 750. Thinner films, e.g. from about 50 to about 200 μm, are employed as upper webs in VSP applications, and even thinner films, e.g. from about 12 to about 50 μm may be employed for conventional packaging applications.

If the easy opening layer is the seal layer, it has preferably a total thickness of from about 2 to about 50 μm, preferably of from about 4 to about 25 μm, and even more preferably of from about 5 to about 18 μm.

In a more preferred embodiment of the present invention the easy opening layer comprising the inventive blend is not the sealing layer, but it is a layer directly adhering to the sealing layer.

In such a case the thickness of the inner easy opening layer comprising the inventive blend is preferably in the range of from about 2 to about 30 μm while the thickness of the seal layer directly adhering to the layer containing the inventive blend is in the range of from about 1 μm up to about 10 μm, preferably up to 7 about μm and even more preferably up to 5 about μm.

If the layer comprising the inventive blend is not the sealing layer, this latter one preferably comprises a polyolefin. More preferably it comprises at least one member selected from the group consisting of ethylene-alpha olefin copolymers, LDPE, MDPE, HDPE, EAA, EMAA, EVA and ionomer. Even more preferably it comprises EVA.

In addition to the sealing, easy opening, layer or in addition to the sealing layer and the easy opening one directly adhered to the sealing layer, the film may also comprise at least another layer, adhered to the surface of the easy opening layer which is not adhered to the sealing layer.

As an example the film may comprise e.g. one or more oxygen barrier layers, if the web has to be impermeable to oxygen or moisture, such as PVDC, EVOH, and polyamide layers, one or more bulk layers, an outer abuse layer, to improve the mechanical properties of the film, and tie layers.

The film containing the inventive blend may be coextruded or laminated.

A third object of the present invention is an easy-to-open package comprising:

a lower thermoplastic web including a first sealant layer (a)

an upper thermoplastic web including a second sealant layer (b)

the lower and upper webs being sealed to each other and enclosing an article, said package being characterized in that at least one of the sealing layers (a) and (b) or the layer directly adhered to one of the sealing layer (a) and (b) comprises a ternary blend of (i) a copolymer of ethylene and acrylic acid or methacrylic acid (ii) a modified EVA copolymer and (iii) a polybutylene In a more preferred embodiment of the present invention one of the two webs is made of a film comprising:

a seal layer (a)

the easy opening layer (c) comprising the new ternary blend, directly adhered to the seal layer (a), and optionally at least another layer adhered to the face of (c) which is not directly adhered to the seal layer (a). These additional layers, as indicated above may include oxygen barrier layers, bulk layers, tie layers, and an outer abuse resistance layer.

The other of the two webs comprises a seal layer (d) and optionally one or more other layers. This or these layers may be barrier layers, bulk layers, tie layers, and an outer abuse resistance layer.

The seal layer of this web preferably comprises a polyolefin. More preferably it comprises at least one member selected from the group comprising ethylene/alpha olefin, LDPE, MDPE, HDPE, EAA, EMAA, EVA, or ionomer. Even more preferably it comprises ionomer.

A package according to this particular embodiment is shown in FIG. 1 and is made of a lower web and an upper web. The lower web comprises at least three layers, a substrate 31, that could be a mono or a multi-layer structure, a sealing layer 33 and another layer 32 directly adhering to the sealing layer. This layer 32 provides for the easy opening of the package.

The upper web comprises at least two layers: a substrate 21 that could be a mono or multilayer structure (like structure 31) and a sealing layer 22.

The chemical composition and structure of the two thermoplastic webs forming the package is not critical, provided that the adherence between the webs is sufficiently strong so that during opening of the package no delamination occurs.

As stated above the present invention provides particular benefits when used in vacuum skin packages but its applicability is not restricted thereto. It is also useful in thermoforming, form-fill-seal, MAP (modified atmosphere packaging) and other packages.

A preferred embodiment according to the present invention is a vacuum skin package, wherein, referring to FIG. 1, package 1 has a upper web 2 that is heated, molded down upon and around the product and against the support, the space between the heated upper film and the support having been evacuated. The upper heated web forms a tight skin around the product and is sealed to the support by differential air pressure.

Machinery for vacuum skin packaging is available e.g. from Multivac Sepp Haggenmueller K.G.

Vacuum skin packaging (VSP) is a well known process where thermoplastic packaging material is used to enclose a product, generally but not necessarily a food product, such as meat, processed meat, fish, and the like.

In VSP the packaging material comprises a lower and a upper web. The item to be packaged is first placed onto the bottom web, which is preferably rigid or semi-rigid, may be flat or tray-shaped, and may also comprise one or more layers of foamed thermoplastic materials. Then the top web, generally pre-heated, and the bottom web supporting the item to be packaged, are separately fed to the packaging station where the top web is further heated by contact with the inner surface of a so-called "dome" which is then lowered over the supported item. The space between the top and bottom webs is evacuated and the top web is allowed to come into contact with the bottom web and with the item to be packaged. The top web may be held against the dome inner surface for instance by vacuum pressure that is then released when it is desired to allow the top web, sufficiently heated, to drape over the product. Sealing of the top and bottom webs is achieved by a combination of heat from the dome and pressure difference between the inside of the package and the outside atmosphere and can be aided by mechanical pressure and/or extra-heating.

In this kind of packaging process the total surface of the top web is sealed to the tray all around the product under vacuum, thus rendering the package difficult to open. It is the wide area to peel that needs particularly suited solutions to facilitate the opening.

Films for vacuum skin packaging (lower web or "bottom", and upper web or "top") are typically multiple-layer films. They may be formed, as indicated above, by coextrusion, if all the layers are thermoplastic materials, or by (co)extrusion coating, or by lamination of two or more single or multiple-layer films. The two webs may also be irradiated i.e. exposed to e-beam irradiation, thus elevating their resistance to the heat treatment.

Figure 2:
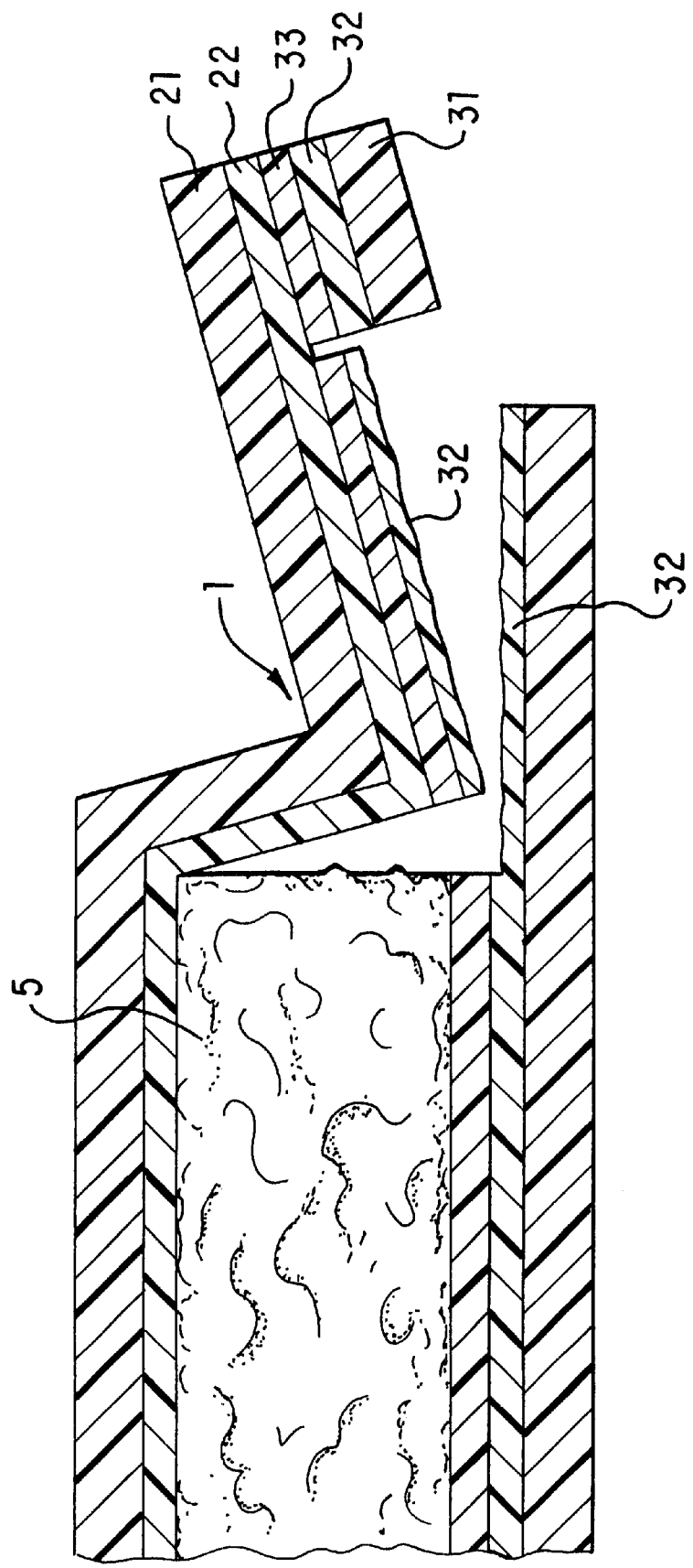

The easy opening mechanism of a VSP package according to the present invention is illustrated in FIG. 1 and FIG. 2 where 2 indicates the upper web, 3 the bottom web, and 7 a pre-cut made on the bottom web after the product has been packaged. This pre-cut facilitates the opening of the package by the consumer, who grasps and tears the thus formed tab and peels off the web. The film comprising the inventive blend (the lower web 3 in these Figures) cohesively fails if subjected even to a low force, such as that reported when manually tearing the web, as it is shown in FIG. 2.

The following examples serve to further illustrate the invention which however is not limited thereto and show that the selection of the layer that cohesively fails is critical for the success of the invention.

EXAMPLES

The easy openability of packages according to the present invention has been tested in comparison with that of prior art packages.

In order to have identical conditions for a meaningful comparison, only the layer that cohesively fails was varied while all the other structural characteristics, such as composition of the other layers, thickness of all the layers and process parameters were held identical or constant respectively.

In particular the packages were made by the vacuum skin packaging process using a MULTIVAC® CD 6000 machine.

The machine settings were
Forming station:
  Heating system by: air
  Forming system by: air
  Bottom temperature: 120° C.
Tooling configuration:
  Tray depth used: 5 mm
Skin/Preheating station:
  Dome height: 30 mm
  Skin temperature: 210° C.

The top web was a flexible coextruded multi-layer film comprising: a seal layer and a substrate comprising the sequence tie/bulk/tie/barrier/tie/outer layer; and the bottom web was a coextruded multi-layer film comprising a seal layer, an easy opening layer directly adhered to the seal layer, and a substrate comprising the sequence tie/bulk/tie/barrier/tie/outer layer.

The composition of the easy opening layer was varied as indicated in Table I. The materials used were as follows:

| component | supplier | trade name | description |
|---|---|---|---|
| ionomer | DuPont | Surlyn ™ 1601 | ionomer resin as defined (MFI = 1.3) |
| mod. EVA | Elf-Atochem | Elvaloy 741 A | modified EVA as defined (MFI = 35) |
| PB1 | Shell | PB 0400 | Polybutene-1 MFI = 20 |
| PB2 | Shell | PB 0200 | Polybutene-1 MFI = 2 |
| PB3 | Shell | PB 8640 | Ethylene/butene-1 copolymer |
| silica | Ampacet | 10853 | natural silica + PE masterbatch |
| slip/antiblock | Cryovac | Cryovac blend | nucleating agent + EVA masterbatch |
| nucleating agent | Sarma | Sarmastab 41285 | nucleating agent + PE masterbatch |
| talc | Sarma | Sarmastab 41286 | talc + PE masterbatch |
| ceramic spheres | Dyneon | E-14830 | ceramic spheres |
| synthetic silica | W.R. Grace | Sylobloc 47 | synthetic silica |

The package samples were prepared loading on a set of tray shaped webs (5 mm deep) of 30 mm in length and 150 mm in width, 12 stripes of product as shown in FIG. 3, and subsequently packaging the products with the above indicated machine setting configuration.

A strip of 25.4 mm in width and 300 mm in length was cut from each collected sample, starting from one of the two extremities of the sample.

Once the specimens were prepared, the measurement of the easy opening strength values was done by the following internal standard procedure:

Manually separate upper and lower webs until the lower web may be fixed into the lower clamp of an Instron dynamometer, and the upper web into the upper one, taking care that the area to be tested lies in the middle of the two clamps and making sure that an adequate tensioning between the two extremities of the fixed sample is obtained.

Release the hold mechanism and pull it down gently so as to set the tensiometer scale to zero.

Start the Instron and peel the specimen apart generating a written record of the peel force by applying the following conditions:

Chartspeed: 30 cm/min
Full scale load: 2 kg

The easy opening strength of a single sample is the average over a 50 mm opening.

Repeat these last steps for all samples.

From the collection of the 12 easy opening strength values generate the average value of easy opening strength and calculate the % variation (3σ).

The results obtained in these tests are summarized in following Table I where the packages according to the present invention are indicated with 1, 2, 3, 4, 5, 6, 7 and 8 while the others are included for comparative purposes.

By using the ternary blend according to the present invention, an easy opening strength was achieved which is comprised between about 2.00 and about 6.00 N/25.4 mm, whilst with the blend described in EP-B-192,131 a higher value was obtained and the addition of other agents to reduce compatibility, such as nucleating agents, talc, antiblock agents (silica), ceramic spheres and synthetic silica, had no influence on the easy opening strength.

The results of Table I also show that the % variation (3σ) for the film of the present invention is remarkably lower than that obtained with the blend of EP-B-192,131 and is lower than about 55%.

TABLE I

| Structure no. | Easy Opening Layer Composition | Average EO Strength N/25.4 mm | % variation (3σ) |
|---|---|---|---|
| 1* | 21% mod EVA + 69% ionomer + 10% PB1 | 2.8 | 26 |
| 2* | 24% mod EVA + 66% ionomer + 10% PB1 | 2.4 | 25 |
| 3* | 24% mod EVA + 66% ionomer + 10% PB2 | 3.1 | 27 |
| 4* | 22% mod EVA + 73% ionomer + 5% PB2 | 3.2 | 22 |
| 5* | 25% mod EVA + 73% ionomer + 2% PB2 | 4.2 | 54 |
| 6* | 22% mod EVA + 58% ionomer + 20% PB1 | 2.4 | 18 |
| 7* | 22% mod EVA + 58% ionomer + 20% PB2 | 1.5 | 35 |
| 8* | 24% mod EVA + 66% ionomer + 10% PB3 | 3.3 | 15 |
| 9 | 25% PB2 + 75% mod EVA | no EO | .... |
| 10 | 25% PB1 + 75% mod EVA | 7.5 | 72 |

TABLE I-continued

| Structure no. | Easy Opening Layer Composition | Average EO Strength N/25.4 mm | % variation (3σ) |
|---|---|---|---|
| 11 | 26% mod EVA + 74% ionomer | 6.9 | 60 |
| 12 | 25% mod EVA + 69% ionomer + 6% silica | 7.2 | 30 |
| 13 | 25% mod EVA + 72% ionomer + 3% slip | 9.1 | 40 |
| 14 | 25% mod EVA + 73% ionomer + 2% nucleating agent | 8.9 | 30 |
| 15 | 25% mod EVA + 72% ionomer + 3% talc | 9.4 | 29 |
| 16 | 26.5% mod EVA + 72% ionomer + 1.5% ceramic sphere | 9.3 | 26 |
| 17 | 26.65% mod EVA + 73% ionomer + 1.5% synth. silica | 9.8 | 34 |

All the percentages indicated are by weight.

What is claimed is:

1. A thermoplastic film comprising a blend of:
   a copolymer of ethylene and acrylic acid or methacrylic acid;
   modified EVA copolymer;
   a polybutylene.

2. The film of claim 1 further comprising a first outer layer, a second outer layer, and an inner layer between the first and second outer layers, wherein the inner layer comprises the blend.

3. The film of claim 1 further comprising at least three layers.

4. The film of claim 1 further comprising a layer comprising the blend, wherein the layer has a thickness ranging about 2 to about 50 microns.

5. The film of claim 1 further comprising a layer comprising the blend, wherein the layer has a thickness ranging about 1 to about 10 microns.

6. The film of claim 1 further comprising:
   a sealing layer comprising ethylene/vinyl acetate copolymer; and
   an adjacent layer directly adhered to the sealing layer, wherein the adjacent layer comprises the blend.

7. The film of claim 1 wherein the film is monolayer.

8. The film of claim 1 wherein the film is multilayer.

9. The film of claim 1 further comprising a sealing layer comprising the blend.

10. The film of claim 1 further comprising:
    a sealing layer; and
    an adjacent layer directly adhered to the sealing layer, wherein the adjacent layer comprises the blend.

11. The film of claim 1 further comprising:
    a sealing layer comprising ionomer; and
    an adjacent layer directly adhered to the sealing layer, wherein the adjacent layer comprises the blend.

12. The film of claim 1 further comprising:
    a sealing layer comprising a polyethylene selected from LDPE, MDPE, and HDPE; and
    an adjacent layer directly adhered to the sealing layer, wherein the adjacent layer comprises the blend.

13. The film of claim 1 wherein the copolymer of ethylene and acrylic acid or methacrylic acid comprises copolymer of ethylene and acrylic acid or methacrylic acid in free acid form.

14. The film of claim 1 wherein the copolymer of ethylene and acrylic acid or methacrylic acid comprises a copolymer of ethylene and alkyl acrylate or alkyl methacrylate.

15. The film of claim 1 wherein the copolymer of ethylene and acrylic acid or methacrylic acid comprises copolymer partially neutralized with cation.

16. The film of claim 1 wherein the copolymer of ethylene and acrylic acid or methacrylic acid comprises ionomer.

17. The film of claim 1 wherein the melt flow index of the copolymer of ethylene and acrylic acid or methacrylic acid is less than 5 grams/10 minutes.

18. The film of claim 1 wherein the melt flow index of the copolymer of ethylene and acrylic acid or methacrylic acid is at least 5 grams/10 minutes lower than the melt flow index of the modified EVA copolymer.

19. The film of claim 1 wherein the modified EVA copolymer comprises a terpolymer of ethylene, vinyl acetate, and carbon monoxide.

20. The film of claim 1 wherein the modified EVA copolymer comprises a terpolymer of ethylene, vinyl acetate, and carbon monoxide, wherein the terpolymer comprises from 3 to 30 weight % of mer units derived from carbon monoxide.

21. The film of claim 20 further comprising:

a sealing layer; and an adjacent layer directly adhered to the sealing layer, wherein the adjacent layer comprises the blend.

22. The film of claim 1 wherein the modified EVA copolymer comprises a copolymer grafted with carboxylic functionalities.

23. The film of claim 1 wherein the modified EVA copolymer comprises a copolymer grafted with anhydride functionalities.

24. The film of claim 1 wherein the polybutylene comprises a copolymer of ethylene and butene.

25. The film of claim 1 wherein the blend comprises from about 35 to about 83 weight % copolymer of ethylene and acrylic acid or methacrylic acid, from about 15 to about 30 weight percent modified EVA, and from about 2 to about 50 weight % polybutylene, based on the weight of the blend.

26. The film of claim 25 further comprising:

a sealing layer; and an adjacent layer directly adhered to the sealing layer, wherein the adjacent layer comprises the blend.

27. The film of claim 1 wherein the blend comprises from about 45 to about 75 weight % copolymer of ethylene and acrylic acid or methacrylic acid, from about 20 to about 30 weight percent modified EVA, and from about 5 to about 25 weight % polybutylene, based on the weight of the blend.

* * * * *

UNITED STATES PATENT AND TRADEMARK OFFICE
CERTIFICATE OF CORRECTION

PATENT NO. : 6,476,137 B1
DATED : November 5, 2002
INVENTOR(S) : Eugenio Longo

It is certified that error appears in the above-identified patent and that said Letters Patent is hereby corrected as shown below:

Column 12,
Line 24, after "copolymer;" insert -- and --

Signed and Sealed this

Fifteenth Day of April, 2003

JAMES E. ROGAN
*Director of the United States Patent and Trademark Office*